United States Patent
Heikkonen et al.

(10) Patent No.: US 8,041,744 B2
(45) Date of Patent: Oct. 18, 2011

(54) COMPUTER-AIDED MODELING

(75) Inventors: Teemu Heikkonen, Helsinki (FI); Ragnar Wessman, Espoo (FI); Pertti Alho, Helsinki (FI); Jukka Partanen, Espoo (FI); Ville Rousu, Espoo (FI); Jukka Suomi, Espoo (FI)

(73) Assignee: Tekla Corporation, Espoo (FI)

( * ) Notice: Subject to any disclaimer, the term of this patent is extended or adjusted under 35 U.S.C. 154(b) by 565 days.

(21) Appl. No.: 11/165,043

(22) Filed: Jun. 24, 2005

(65) Prior Publication Data

US 2006/0004841 A1      Jan. 5, 2006

Related U.S. Application Data

(60) Provisional application No. 60/586,723, filed on Jul. 12, 2004.

(30) Foreign Application Priority Data

Jun. 24, 2004   (FI) ..................................... 20045240

(51) Int. Cl.
*G06F 7/00* (2006.01)
*G06F 17/30* (2006.01)
(52) U.S. Cl. ..................................................... 707/796
(58) Field of Classification Search .................. 707/791, 707/793, 796
See application file for complete search history.

(56) References Cited

U.S. PATENT DOCUMENTS

| | | | | |
|---|---|---|---|---|
| 6,219,049 | B1* | 4/2001 | Zuffante et al. | 715/764 |
| 6,611,725 | B1* | 8/2003 | Harrison et al. | 700/98 |
| 6,898,560 | B1* | 5/2005 | Das | 703/7 |
| 6,963,824 | B1* | 11/2005 | Davidson et al. | 703/2 |
| 6,996,505 | B1* | 2/2006 | Edelsbrunner et al. | 703/2 |
| 7,039,569 | B1* | 5/2006 | Haws et al. | 703/7 |
| 7,099,803 | B1* | 8/2006 | Rappoport et al. | 703/1 |
| 2003/0223807 | A1* | 12/2003 | Lanphier | 403/167 |
| 2004/0031231 | A1* | 2/2004 | Rousu et al. | 52/745.19 |
| 2004/0098235 | A1* | 5/2004 | Rihtniemi et al. | 703/1 |

FOREIGN PATENT DOCUMENTS

FI       20021097       12/2003

OTHER PUBLICATIONS

A Computerized Design Environment for Functional Modeling of Mechanical Products, Y.M. Deng, S.B. Tor G.A. Britton, Nanyang Technological University, Singapore.

(Continued)

*Primary Examiner* — Kuen S Lu
*Assistant Examiner* — Hexing Liu
(74) *Attorney, Agent, or Firm* — Young & Thompson

(57) ABSTRACT

In a modeling method and system, a model is created by using parametric basic elements and parameterized complementary elements, each having special parameters; such that a complementary object to be created with a parameterized complementary element is directly or indirectly, at least via one of its parameter values, associated with at least one basic object created with a basic element.

14 Claims, 3 Drawing Sheets

OTHER PUBLICATIONS

A Modeling System for Top-Down Design of Assembled Products, M. Mantyla, IBM J. Res. Develop. vol. 34 No. 5 Sep. 1990.

Attribute-Based Design Description System in Design for Manufacturability and Assembly, Srinivas Paluri, Microsoft Corporation, Redmond, WA, John K. Gershenson, Department of mechanical Engineering, Engineering Mechanics, Michigan Technological University, Houghton, MI, 49931, 2001 Society for Design and Process Science Printed in the United States of America.

Design of a Thermo-Hydraulic Model Library in Modelica, Hubertus Tummescheit, Jonas Eborn, Department of Automatic Control, Lund Institute of Technology, Box 118, SE-221 00 Lund, Sweden Hubertus.Tummescheit@gmd.de, jonas@control.lth.se Modelica—A Language for Physical System Modeling, Visualization and Interaction, The 1999 IEEE Symposium on Computer-Aided Control System Design, CACSD'99, Hawaii, Aug. 22-27, 1999, Hilding, Elmqvist, Dynasim AB, Research Park Ideon, Se-223 70 Lund, Sweden, E-mail: Elmqvist@Dynasim.se , Sven Erik Mattsson, Dynasim AB, Research Park Ideon, Se-223 70 Lund, Sweden, E-mail: SvenErik@Dynasim.se, Martin Otter, DLR Oberpfaffenhofen D-82230 Wessling, Germany, E-mail: Martin. Otter@Dynasim.se .

Modelica and Smile—A Case Study Applying Object-Oriented Concepts to Multi-Facet Modeling, Hubertus Tummescheit, DLR Koln, Hauptabteilung Energietechnik. Linder Hohe, D-51140, Koln, Germany, Hubertus.Tummescheit@dlr.de Matthias Klose, Technical university of Berlin, Software Engineering Research Group, Franklinstr. 28/29 D-10587 Berlin, Germany, Matthias.Klose@cs. tu-berlin.de Thilo Ernst, GMD First Research Inst. For Computer Architecture and Software Technology, Rudower Chaussee 5, D-12489, Berlin, Germany Thilo.Ernst@gmd.de.

New Concepts for Complete Product Assembly Modeling, Jin-Kang Gui and Martti Mantyla, Laboratory of Information Processing Science, Product modeling and Realization Group, Helsinki University of Technology, SF-02150, Espoo 15, Finland, $2^{nd}$ ACM Solid Modeling 93-5/93/Montreal, Canada.

\* cited by examiner

COMPUTER-AIDED MODELING

FIELD OF THE INVENTION

The invention relates to computer-aided modeling and particularly to parametric modeling.

BACKGROUND OF THE INVENTION

Modeling refers to the creation of a model from an object under design for describing the object to be manufactured. The development of data processing systems and computers has converted modeling into a computerized process, wherein a product model is created from the object. The product model of a building is the whole composed of the product data of the life span of the building and the building process. The product model of a building describes the product data of the building outlined in accordance with a product data model. The product model of a building may be stored as a database of a computer application or as a file suitable for data transfer. Computer applications describe the real-world building elements of the building using corresponding building element entities processed by the applications.

When modeling takes place by computer applications, two different approaches to modeling are in use: bottom-up and top-down. Bottom-up is developed from the requirements of the bulk industry and mechanics design to model individual pieces as flexibly and accurately as possible, wherein an independent model is created from individual parts and, if the final object comprises a plurality of parts, the model of the object is composed of the models of the individual parts by combining them together suitably. Top-down is developed from the requirements posed by the construction industry and other such industrial sectors, wherein large, differently hierarchical, unique objects composed of up to dozens of thousands of parts have to be designed and manufactured, wherein one product model is created from the entire object, whereby the building elements know that they belong to an entirety, and management of the entirety of the building is considerably easier than in the aforementioned bottom-up modeling. These modeling methods should not be mixed up with techniques employed in the processing of what are known as libraries for facilitating the processing: depending on the direction of movement, the movement in the hierarchy tree of a library is often also referred to as the top-down method (movement from the root of the hierarchy tree to the nodes) and the bottom-up method (movement from the nodes to the roots). However, these library movement methods do not correspond to the methods employed in modeling, although the names employed are the same.

In the construction industry and other industrial sectors, elements and objects have to be designed with limitless variations in appearance and product data. To manage this multiformity, parametric modeling has been taken into use in bottom-up modeling, wherein the modeler is able to create new building elements by storing parametric elements in a so-called library. In parametric modeling, the physical characteristics of an object are not programmatically fixed to the modeled object, but the physical characteristics are defined by giving the object different attributes as parameters, on the basis of which the geometry, i.e. the shape, of the modeled object is created. Since parameters may be created for the object without programming and since the size, shape and product data of the object can be changed by means of the parameters, the changing of a parametric object is quite simple. Owing to parametricity, objects modeled by copying the same object can also be changed by changing the librarized element.

In parametric modeling systems, the modeling of a column, for example, is initiated by searching the library, wherein column elements of different shapes are defined in advance (FIG. 1), for a column element fulfilling the correct details. FIG. 1 shows a small sample of a column library required when 0 to 3 beams are connected to a column. If the desired column element is found in the library, it is selected, values are assigned to the parameters of the column element, and the column thus created is added as part of the model and stored in a memory. The column is then part of the model. If the column is to be changed, for instance if one beam more or fewer is connected to the column than was assumed during the creation of the column, the library is searched for a column element according to the correct detail. If it is found, the data on the old column are deleted from the model, the new column element is selected, values are assigned to the parameters of the column element, the column is added as part of the model, and stored in a memory. The model then comprises a new kind of column. If a suitable column element is not found in the library when the column is created into the model for the first time or later when being changed, a new column element has to be defined in the library. The problem in this modeling method is that the library has to include a library element including the correct details, whereby the size of the library becomes large, thus complicating its use, requiring extremely much of the librarization system, and consuming memory resources, even if a hierarchical librarization system were utilized. From the point of view of the modeler, it is problematic that the starting point of the design is not from a logical direction and the final ensemble should be anticipated at the very beginning of the design in order to avoid unnecessary and error-prone amendment later on. For example, when creating a column, one should know how many beams are to be connected to the column in order to be able to select the right column library element, i.e. column element.

In top-down modeling, the last mentioned problem does not exist, since the entirety is modeled first in top-down modeling, and then the parts of the whole etc. and lastly the details. In other words, in top-down modeling, the aforementioned multiformity requirement is achieved by dividing the building elements into smaller wholes, such as separate building elements, connections and details that are programmed as part of the modeling program. These smaller programmed wholes are combined to enable the creation of the most typical building elements in use. In prior art solutions, the whole is achieved by creating objects in the model from generic elements, which can be freely combined. For example, when creating a column, one does not know how many beams are connected to the column, for example. In top-down modeling, the generic elements and the connections between them are implemented by software, the problem being that it does not include parametricity; instead, all characteristics of the modeled objects have to be programmed into the modeling program. For example, if a given kind of connection type is required, which is not programmed, it cannot be made, but a so-called user's connection can be made at most, which cannot be parameterized. An additional problem is that the inheritance of the characteristics cannot be utilized in propagating the changed to several parts at the same time. This means that if the cross-section of a column is changed, for example, the modeler himself has to change the connection created with a user's connection to correspond to the changes of the column.

In several top-down modeling systems, new connections and details can be added by adding programmed parametric connections to the modeling system. In other words, the program library therein includes definitions of different connections and details, from which the modeler or the modeling program selects the correct connection on the basis of given rules depending on the beams and/or columns to be connected, for example. The problem in this solution is that each connection programmed in the modeling program increases the program library unnecessarily thus causing the aforementioned problems, impairing the manageability of the library, for example. A further problem is that parametricity exists only in pre-programmed connections.

BRIEF DESCRIPTION OF THE INVENTION

The object of the invention is thus to provide a method and an apparatus for implementing the method so as to solve the above problems. The object of the invention is achieved with a method, system and software product, characterized in what is stated in the independent claims. Preferred embodiments of the invention are described in the dependent claims.

The invention is based on detecting the problem and solving is by employing two kinds of elements in the modeling: parametric basic elements and parameterized complementary elements, each having individual parameters. The basic elements resemble the generic elements of top-down modeling, since they can be used to create independent objects, but, in contrast to prior art top-down modeling, the geometry of the object created with the basic element of the invention is defined by means of parameters. When an object is created with a basic element, there is no need to pay attention to the requirements posed by the surrounding structures. Examples of basic elements include a column element, a beam element, a plate element, a wall element, etc. A complementary element, in turn, is a parameterized element with which the object created is connected to at least one object created with the basic element, and the object created thereby pays attention to the requirements posed by the connecting structures. Of the parameters of a complementary element, the value of at least one parameter is directly or indirectly dependent on an object created with the basic element. Complementary elements are typically connection elements.

An advantage of the invention is that it allows the size of the libraries of parametric elements to be considerably diminished in parametric modeling, simultaneously facilitating the work of the designer: he has the advantages of parametric modeling and top-down modeling at his disposal. For example, there is no need to try to foresee the final implementation in advance and updating changes is considerably easier.

BRIEF DESCRIPTION OF THE FIGURES

In the following, preferred embodiments of the invention will be described in more detail with reference to the attached drawings, in which.

DETAILED DESCRIPTION OF THE INVENTION

The present invention can be applied to any modeling system, wherein the physical characteristics and other attributes of a piece are manageable by means of parameters created by a modeler.

In the following, the invention will be described by using an exemplary system, wherein the program of the invention is run in a personal computer by utilizing a run-time database comprising information to be stored and already stored in a disc memory of the computer about the entire object (to be) modeled, for instance a building, without restricting the invention thereto. In some other embodiment of the invention, an object-oriented database or a relation database, for example, can be utilized and used over a network from one or more terminals, for example. Different programming techniques, storage of data in a memory and manners of implementing databases develop continuously. Such a development may require extra changes in the invention. Consequently, all terms and expressions should be interpreted broadly, and they are intended to describe, not restrict, the invention.

Figure 2:
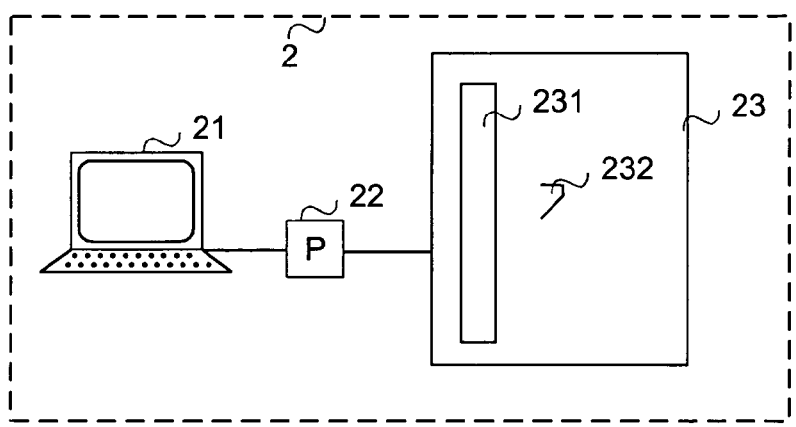
FIG. 2 is a simplified block diagram of the architecture of an exemplary system.

FIG. 2 shows a simplified modeling system describing only the essential parts of the logical units of the system, the implementation of which may deviate from what is presented. It is evident to a person skilled in the art that the system may comprise also other functions and structures that need not be described in more detail herein. The more detailed structure of the system is irrelevant to the actual invention.

The modeling system 2 illustrated in FIG. 2 comprises a personal computer including a user interface 21, a processor 22, and memory 23.

The user interface 21 is the interface of the user, i.e. the processor of the model, to the modeling system. The user may also be called modeler. The user is able to create a model, modify a model, study it, print the desired figures, reports thereof, etc., by means of the user interface. The manner of inputting information into the modeling system is irrelevant to the invention. The manners described below for supplying information only describe examples, and do not restrict the invention in any way.

In accordance with the different embodiments of the invention, the processor 22 carries out tasks according to the invention. The memory 23 comprises a library according to the invention and data (to be) stored in connection with the modeling. In the exemplary system, the data are stored in the memory for instance in a file, and during processing, the data constitute a so-called run-time database in the central memory wherein they are read from a disk memory and wherein they can be processed in a more high-speed manner. When processing ends, the run-time data of the database, or at least the altered data, are stored in the disk memory. It is evident to a person skilled in the art that data can be stored in one or more files and/or they can be stored/processed in another form and/or by using other memories.

The library comprises basic elements, such as a column element 231 and complementary elements, such as a complementary element 232 to be associated with the column, for example, and element-specific data on the parameters and their default values. The invention does in no way restrict the parameter types associated with the basic elements or the complementary elements, but the parameters to be used include location, material, type and size of cross-section, characteristics of a connecting part, different logical characteristics, such as logical levels, etc. However, a complementary element always has to have at least one parameter indicating, directly or indirectly, the basic object(s) created with the basic element that the complementary element is associated with, i.e. the basic object(s) whose requirements have to be taken into account. Herein, such parameters are called associating parameters. Depending on the embodiment and the implementation, a complementary element may include, as a parameter or in another manner, information about whether it will become part of the object (e.g. a column consol) created with a basic element or not (e.g. a bolt connection). The complementary element does not either have to be an individual part, such as the complementary element 232 of FIG. 2, but it may comprise several parts. The complementary element may also have a hierarchical structure. For example, a modeler may assemble a connection of bolts and metal plates as a complementary element, or take a completed connection and modify it into a complementary element or generate special complementary elements by combining different connections with each other. In the latter examples, the associating parameter is very often an indirect associating parameter.

The modeling system shown in FIG. 2 shows the simplest modeling system. In larger modeling systems, a terminal may constitute the user interface, and a database, with which the terminal communicates via a server, may constitute the memory. The server performs the functions of the processor of the exemplary system, or at least part thereof, allowing the terminal also to carry out the functions of the processor of the exemplary system. Between the terminal and the server, one or more networks may be provided. They may comprise a plurality of terminals and several servers with databases, which are then preferably integrated to be visible to the modeler as one database and one database server. Whether the functions of the system to be described in the following are performed in a terminal, in a database server or in such a manner, that part thereof is performed in a terminal, part in a database server, i.e. the location where the data in the database are processed, is irrelevant to the invention.

Figure 3:
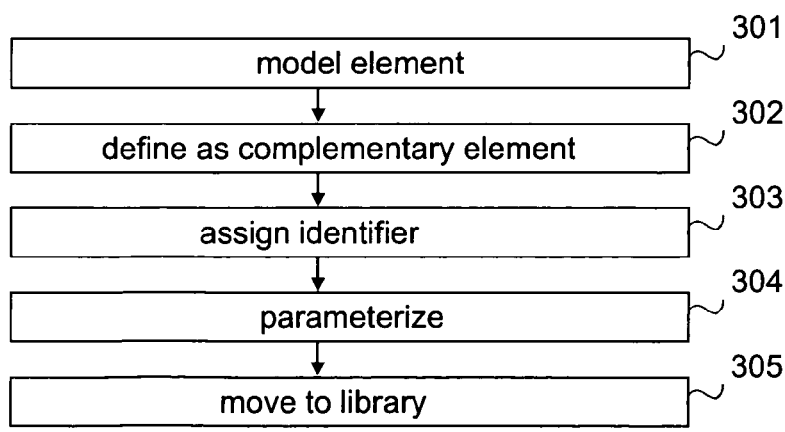
FIGS. 3, 4, 5 and 6 are flow diagrams illustrating the modeling system according to the invention.

In the modeling system according to the invention, the modeler is interactively able to define parameterized complementary elements in the library. The addition of a complementary element to the library is illustrated in FIG. 3, showing an example of adding parameterized complementary elements to a library. It is evident to a person skilled in the art that there are several manners of adding them, and only one of them is described herein.

In the example of FIG. 3, the addition of a complementary element is initiated by modeling an element in step 301. For example, the modeler may model a consol between a column and a beam. In other words, the modeler defines the desired parts and selects them. Next, in step 302, the modeler defines the element as a complementary element and assigns an identifier thereto in step 303. Next, in step 304, the modeler parameterizes the complementary element by assigning both associating parameters with default values thereto and other parameters with default values. In the case of a consol, for example, the modeler assigns a primary element, i.e. a column, as the first associating parameter, a secondary element, i.e. a beam, as the second associating parameter, and then other parameters. For example, the width of the consol can be defined to be the same as the width of the secondary element, and the height of the consol as n*secondary element. In addition, at this stage, as parameter is also assigned the information whether the complementary object created with the complementary element will become part of the basic object created with the basic element. For example, when a consol complementary element is modeled, the information 'this consol will be part of the primary element' is given. When the complementary element is parameterized, the complementary element and its definitions are transferred into the library in step 305. The complementary element can thereafter be employed in the modeling.

Figure 4:
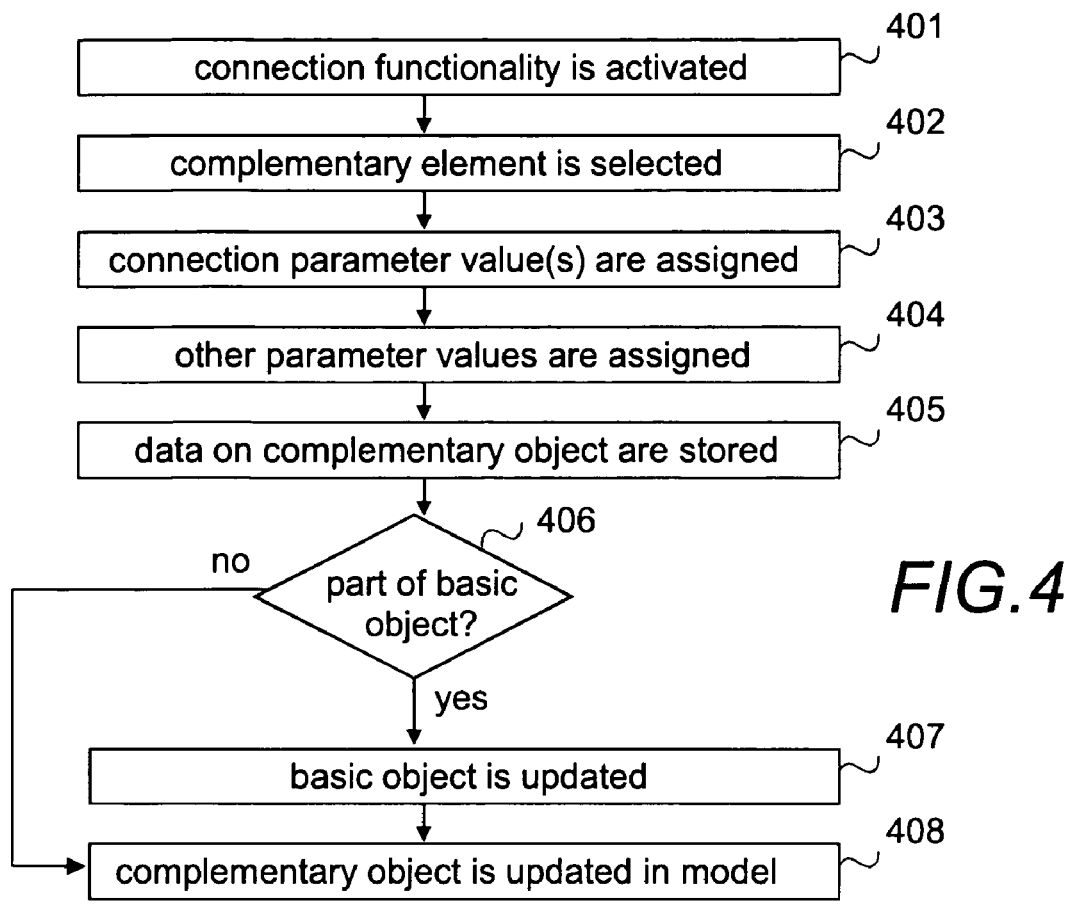
Figure 5:
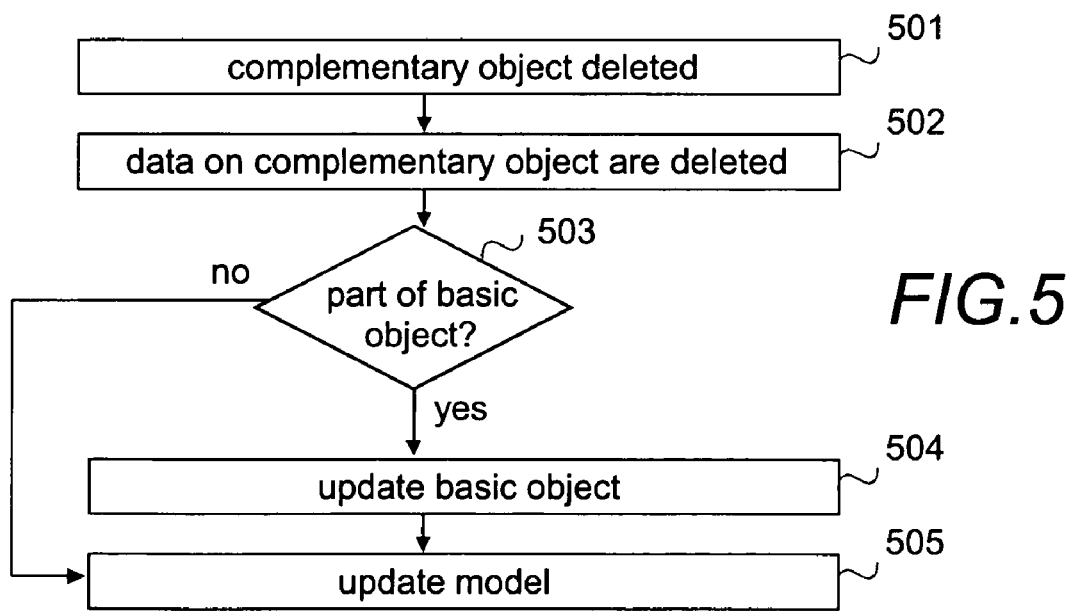
Figure 6:
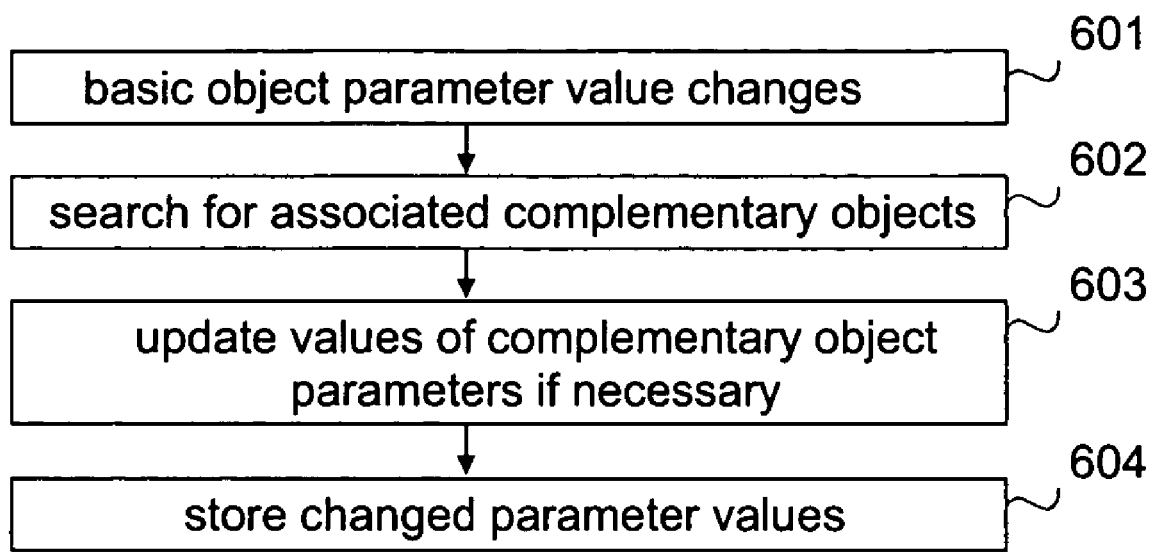

The actual modeling according to the invention is described in FIGS. 4, 5 and 6 by means of an example, in FIG. 4, a complementary object is added to the model, in FIG. 5, the complementary object is deleted from the model, and in FIG. 6, the basic object changes. For the sake of clarity, the figures only illustrate what happens to one basic object created with a basic element, a column, for example. It is evident to a person skilled in the art that the same can occur in parallel to several basic objects, to a column and beam to be connected together, for example. In the exemplary embodiment of FIGS. 4 and 5, two types of complementary elements are in use: those constituting one whole together with one or more objects created with a basic element, and those associating objects together in one way or another but not constituting a whole.

With reference to FIG. 4, the connection functionality of modeling is activated in step 401. It may be activated because the modeler selects the connection functionality, for example, or the connection functionality is activated when an object created with a basic element is connected to another object created with a basic element. The same data can be alternatively obtained by software for instance on the basis that the objects created with basic elements collide with each other within a given tolerance.

Next, in step 402, a suitable complementary element is selected from the library. The selection can be made by the modeler, the modeling program or the former and the latter together. For example, the modeling program may suggest a consol for a concrete column and bolts for a steel column, but the modeler may select bolts for a concrete column. The manner of selecting the complementary element is irrelevant to the invention. In step 403, the complementary object created with a complementary element is assigned an associating parameter value or values. In other words, when a complementary object is created, information is given at least about the basic objects to be taken into account by the complementary object. For example, if a column is to comprise a consol, when the beam is joined with the column, information about the column and the beam exist as associating parameter values of the consol. The modeling program itself may assign/derive these values or they can be inquired of the modeler. Then, in step 404, possible other parameter values of the complementary object are assigned. The parameters of the objects to be connected can be utilized in defining other parameter values of the complementary object, the values can be inquired of the modeler and/or the modeling program may assign/derive the values.

Once the complementary object is finished, the data of the complementary object are stored in the model in step 405. All information about the complementary object is stored that is required in order for the complementary element to remain similar when the model is opened the next time. In addition to parameter values, definition points, for example, are stored. Then, in step 406, a check is made to find out if the complementary object will become part of the basic object created with the basic element. Typically, this information is in the complementary element as a data item 'a complementary element intended as part of a column element', but it may also be inquired of the modeler. If the complementary object will become part of the basic object, the basic object created with the basic element is updated (step 407) to include information about the complementary object and any other objects possibly associated with the basic object via the complementary object. The update may preferably also include updating the geometry of the object at the user interface. In other words, the geometry of the complementary object is added to the preliminary geometries of the objects to be modeled, whereby the appearance changes. For example, if a consol is connected to the column of FIG. 2, created with a column element 231, the appearance of the column may resemble for instance the appearance of column 14, 16 or 17 of FIG. 1, without the corresponding library elements being required. If the complementary object will not become part of the basic object, the complementary object is updated in step 408 into the model visible at the user interface.

The starting point in FIG. 5 is a situation wherein a complementary object is deleted (step 501) from the model either because the beam connected to the column is deleted, for example, or because the modeler has explicitly selected the complementary object and its deletion. In response to the deletion of the complementary object, in step 502, the information stored about the complementary object is deleted from the model data, including the parameter values of the complementary object. Then, in step 503, a check is made to see if the complementary object was part of the basic object. If the complementary object was part of the basic object, the basic object created with the basic element is updated (step 504) in such a manner that it no longer includes information about the complementary object and any other objects possibly associated with the basic object via the complementary object. The update preferably also includes updating the geometry of the object at the user interface. In other words, the geometry of the complementary object is deleted from the geometry of the objects to be modeled, whereby the appearance changes. For example, if a consol to be deleted is connected to a column created with the column element 231 of FIG. 2, the column 14, 16 or 17 having the appearance of FIG. 1, for example, takes the appearance of column 18 of FIG. 1. If the complementary object was not part of the basic object, the model visible at the user interface is updated in step 505 in such a manner that the complementary object is deleted.

FIG. 6 illustrates what happens to a complementary object created with a complementary element when the basic object created with the basic element changes, the width of the column is increased, for example.

With reference to FIG. 6, the parameter value of the basic object changes in step 601, the width increases, for example. In response to the change, in step 602, the complementary objects associated via their associating parameter directly or indirectly to the basic object are searched for, and in step 603, the complementary objects are updated if need be. In the update, the parameters of the complementary object are preferably gone through one complementary object at a time in such a manner that, in step 603, each parameter value of the complementary object that depends on the changed parameter value of the basic object is changed. For example, if the column comprises a consol whose width depends on the width of the column, the width of the consol is changed correspondingly when the width of the column changes. If the width of the consol depended only on the width of the beam, the change in the width of the column would not affect the width of the consol. When the parameters of the complementary objects are gone through, the changed parameter values are stored in the model in step 604.

Figure 1:
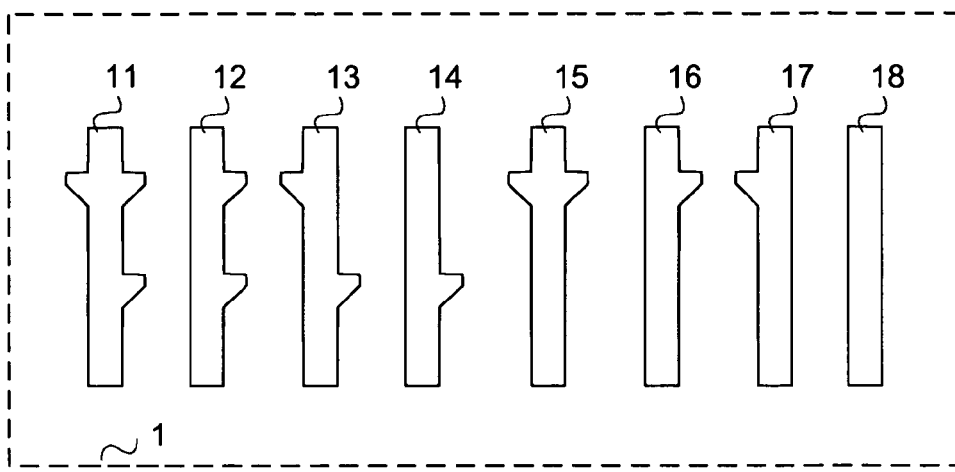
FIG. 1 shows part of a library required by a prior art modeling system.

When required, the above steps are repeated during the entire modeling, whereby the shape of the object created with the basic element changes along with the modeling. For example, at first, the column is a straight column without complementary objects (column 18 in FIG. 1), but along with modeling, it may change into a column with three complementary objects as shown in the example of FIG. 1, for example (column 11 of FIG. 1), and finally become a column with two complementary objects, column 12, 13 or 14 of FIG. 1, for example.

The steps shown in FIGS. 3, 4, 5 and 6 are not in an absolute chronological order and they can be performed deviating from the given order or simultaneously. Other functions may be performed between the steps described or simultaneously with them. For example, in step 402, several complementary elements may be selected and a connection with parameter values can be constructed from them and placed in an empty space. Part of the steps shown in the figures can also be omitted, for instance steps 406, 408, 503 and 505 in an embodiment wherein a complementary object created with a complementary element always becomes part of some basic object and wherein the other connections are implemented in accordance with the prior art, for example. Part of the steps described can also be replaced with a step accomplishing a corresponding end result.

The modeling system implementing the functionality according to the present invention comprises not only means required for prior art modeling, but also means for generating the geometry of an object on the basis of the basic object and connection objects connected thereto. More exactly, it comprises means for implementing at least one of the above-described embodiments. Present-day personal computers, terminals and database servers comprise processors and memory that can be utilized in the functions of the invention. All changes and configurations required for implementing the invention can be performed as added or updated software routines, application circuits (ASIC) and/or by otherwise configuring an existing system, a modeling program, in particular. The software/software routine(s) can be stored in any computer-readable data storage means.

It is obvious to a person skilled in the art that as technology advances, the basic idea of the invention can be implemented in a variety of ways. The invention and its embodiments are thus not limited to the above examples, but may vary within the scope of the claims.

The invention claimed is:

1. A modeling method, wherein a model comprises objects created by different types of elements, said method comprising the steps of:
   providing elements of different geometry, each element having individual parameters, wherein a geometry of a corresponding object is defined based on the individual parameters of each element,
   each element being one of at least two types of elements, the at least two types of elements comprising a elements of first type and elements of a second type,
   an element of the first type being a parametric element used to create an independent object which may exist alone or be associated with one or more other objects,
   an element of the second type being a parameterized element used only to create a non-independent object after an object created by means of an element of the first type has been created, and has to have in its individual parameters at least one parameter via whose value an object created by the means of the element of the second type is to be associated directly or indirectly with an object created by an element of the first type, and at least one element of the second type is provided with information indicating that an object created by means of the provided at least one element of the second type is to be a part of an object created by means of an element of the first type;
   creating a first object to a model by selecting at least one element of the first type and providing parameter values to the selected element,
   creating a preliminary geometry for an object to be modeled by means of the first object;

adding to the model, at least once, a second object created by means of an element that is one of the at least one element of the second type provided with the information, the second object being associated with the first object; and generating the geometry of the object to be modeled by adding, to the preliminary geometry, the geometry of the second object so that the geometry of the second object is incorporated into the preliminary geometry.

2. The modeling method of claim 1, further comprising: deleting the second object; and generating the geometry of the object without the geometry of the deleted second object.

3. The modeling method of claim 1, further comprising changing, in response to a change in the parameter value of the first object, a parameter value-dependent parameter value of the second object correspondingly.

4. The modeling method of claim 1, further comprising, when the further object is created by means of an element of the second type, changing, in response to a change in the parameter value of the first object, the further object correspondingly.

5. The modeling method of claim 1, further comprising: receiving definitions for an element of the second type from a modeler, and transferring the element with the definitions to a memory to be provided for modeling.

6. The modeling method of claim 1, wherein the modeling method is top-down modeling.

7. A non-transitory computer readable memory storing a computer program, wherein execution of said program cause the computer to:

provide, via a user interface, a user of the computer with elements of different geometry, each element having individual parameters based on parameters at least a geometry of a corresponding object is defined, each element being one of at least two types of elements, the at least two types of elements comprising a first type and a second type, the first type being a parametric element that used to create an independent object which may exist alone or be associated with one or more other objects, the second type being a parameterized element used only to create a non-independent object after an object created by means of an element of the first type has been created, and has to have in its individual parameters at least one parameter via whose value an object created by the means of the element of the second type is to be associated directly or indirectly with an object created by means of an element of the first type, and at least one element of the second type is provided with information indicating that an object created by means of the provided at least one element of the second type is to be part of an object created by means of an element of the first type;

create a preliminary geometry for an object to be modeled by means of the first object;

allow creation of a further object to a model by means of an element of the second type only in response to an object created by means of an element of the first type already existing in the model; and generate, in response to the further object being created by means of an element that is one of the at least one element of the second type provided with the information and associated with the first object, the geometry of the object to be modeled by adding to the preliminary geometry, the geometry of the further object so that the geometry of the second object is incorporated into the preliminary geometry.

8. The computer readable memory of claim 7, wherein execution of said program further cause the computer to change, in response to a change in the parameter value of an object created by means of an element of the first type with which the further object is associated via a parameter value, the further object correspondingly.

9. The computer readable memory of claim 7, wherein execution of said program further cause the computer to generate a geometry of an object to be modeled by combining a geometry of an object created by means of an element of the first type with a geometry of the further object.

10. A computer system for computer aided modeling in which a model comprises objects created by means of elements, the computer system comprising:

a memory storing elements of different geometry, each element having individual parameters based on which at least a geometry of a corresponding object is defined, each element being one of at least two types of elements, i) a first type being a parametric element used to create an independent object which may exist alone or be associated with one or more other objects, and ii) a second type being a parameterized element used only to create a non-independent object after an object created by means of an element of the first type has been created, and has to have in its individual parameters at least one parameter via whose value an object created by the means of the element of the second type is to be associated directly or indirectly with an object created by an element of the first type, at least one element of the second type being provided with information indicating that an object created by means of the provided at least one element of the second type is to be a part of an object created by means of an element of the first type; and a computer processor configured to generate a model in such a manner that only if the model contains at least one first object created by means of an element of the first type, a further object may be created to the model by means of an element of the second type, and to identify when the further object is to be a part o the first object, in response to the identification, to update a geometry of the first object with a geometry of the further object so that the updated geometry incorporates the geometry of the further object.

11. The computer system of claim 10, wherein the processor is further arranged to update the further object in response to a change in the first object with which the further object is associated.

12. The computer system of claim 10, wherein the processor is further arranged to update the further object in response to a change in the first object.

13. The computer system of claim 10, further comprising a user interface, via which a modeler is able to define elements of the second type, wherein the processor is configured to store elements defined by the modeler to the memory.

14. The computer system of claim 10, further comprising a user interface, via which interface a modeler is able to provide parameter values to elements of the first and second type to create and update a model, and to define only elements of the second type to be stored by the processor to the memory, wherein the elements of the first type are predefined and pre-programmed to a modeling program used for modeling the model.

* * * * *